Nov. 18, 1958     R. W. O'CONNOR ET AL     2,860,401
FEED REGULATOR FOR STEREOTYPE FINISHING MACHINES
Filed April 19, 1957     2 Sheets-Sheet 1
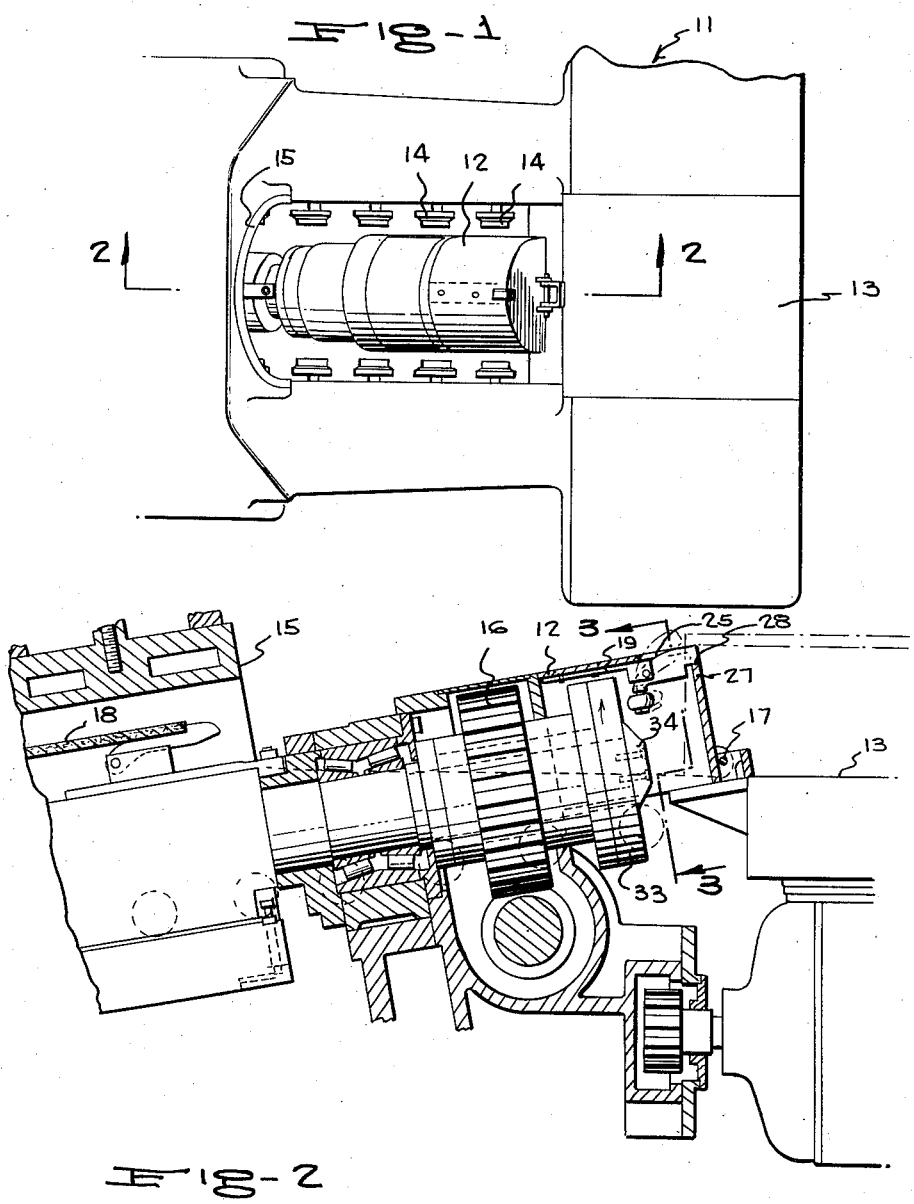
INVENTORS
ROBERT W. O'CONNOR &
MARTIN H. McNULTY
BY
McMorrow, Berman + Davidson
ATTORNEYS

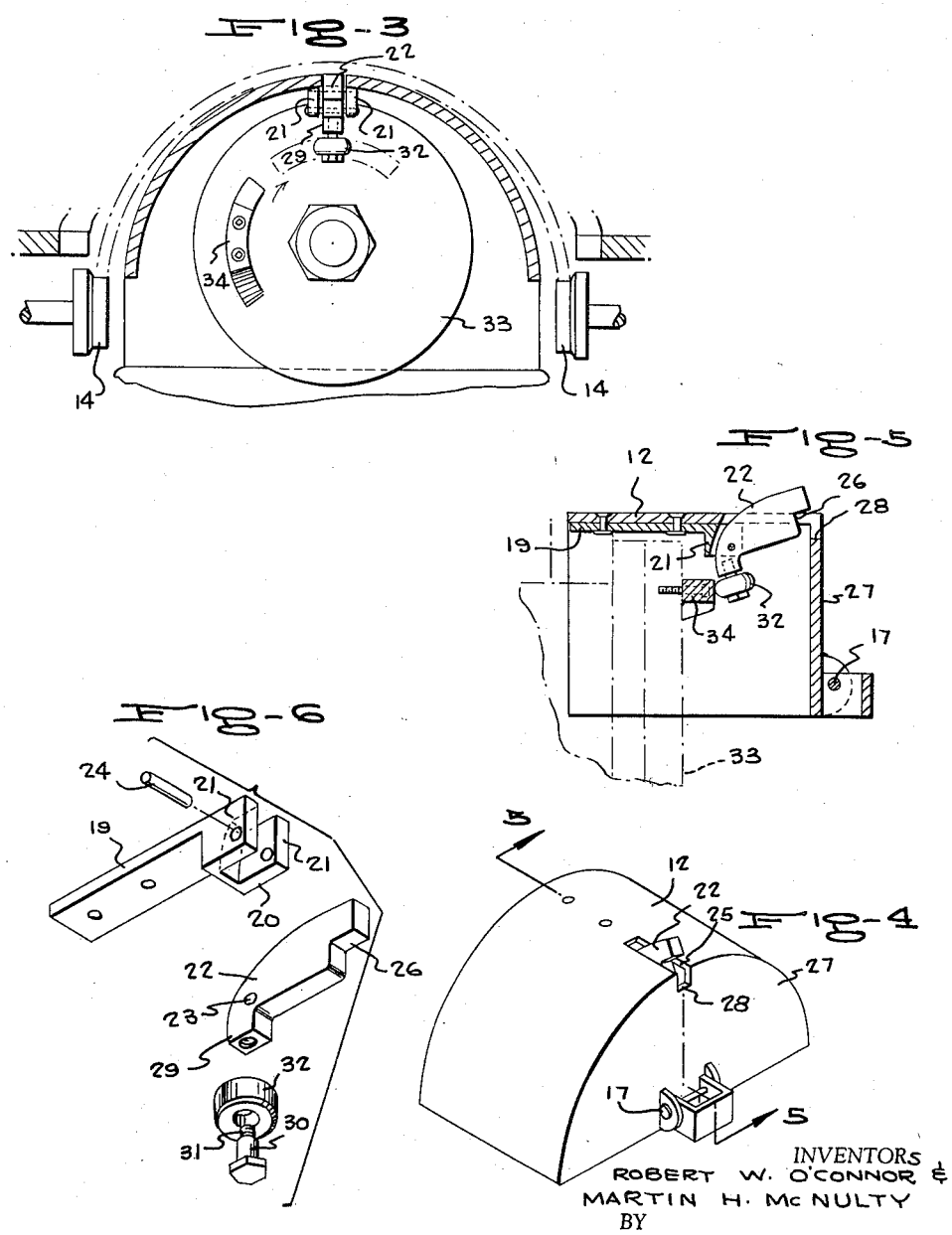

United States Patent Office 2,860,401
Patented Nov. 18, 1958

2,860,401

FEED REGULATOR FOR STEREOTYPE FINISHING MACHINES

Robert W. O'Connor, South Plainfield, and Martin H. McNulty, North Plainfield, N. J.

Application April 19, 1957, Serial No. 653,871

2 Claims. (Cl. 29—21)

This invention relates to stereotype plate finishing machines, and more particularly to a machine wherein stereotype plates are shaved to a desired thickness.

A main object of the invention is to provide a novel and improved device to prevent plates from entering a stereotype machine in the course of processing before the machining elements are in a proper position to receive the plates, thereby eliminating fouling of the machine, preventing breakage or other damage thereto, and preventing spoilage of the plates.

A further object of the invention is to provide an improved automatic stop means for preventing stereotype plates from being placed in a stereotype processing machine until the processing elements of the machine are in proper positions to operate on the plates, the device being simple in construction, being reliable in operation, and being inexpensive to install.

Further objects and advantages of the invention will become apparent from the following description and claims, and from the accompanying drawings, wherein:

Figure 1 is a fragmentary top plan view of a stereotype processing machine provided with an improved stop device according to the present invention.

Figure 2 is an enlarged vertical cross sectional view taken on the line 2—2 of Figure 1.

Figure 3 is a transverse vertical cross sectional detail view taken on line 3—3 of Figure 2.

Figure 4 is a perspective view of the pivoted semi-cylindrical core member on which a stereotype printing plate is received for processing in the machine, said core member being provided with the stop mechanism of the present invention for preventing a stereotype printing plate from being fed to the machine until the elements of the machine are in proper positions for operating on the plate.

Figure 5 is a vertical cross sectional view taken longitudinally through the core member of Figure 4 and showing details of the stop mechanism.

Figure 6 is a perspective enlarged view of portions of the stop mechanism of Figures 3, 4 and 5, shown in separated positions.

Referring to the drawings, 11 designates a generally conventional stereotype printing plate processing machine for performing certain operations on a stereotype printing, for example, for shaving the plate to the proper thickness, or for milling pockets in the underside of the plate. The machine 11 includes the pivoted semi-cylindrical core member 12 on which a stereotype plate is positioned, the plate being moved from a supply table 13 in a substantially axial direction to be engaged over the core member 12, the edges of the plate being supported on rollers 14, provided on opposite sides of the core member 12 and supporting the edges of the printing plate as it is moved through the machine. Designated at 15 is the shaving arch of the machine, the drawings merely illustrating the portion of the machine ahead of the shaving arch, the remainder of the machine being conventional, and being fully disclosed in the prior patent to H. A. Wood et al., 2,364,032, issued November 28, 1944.

The core member 12 serves to protect the underlying parts of the machine, for example, the worm wheel 16 and associated parts, as well as to provide a guide means for mounting a stereotype plate to be processed on the initial rollers 14 of the machine.

The core member 12 is hinged to the margin of the loading platform 13 at 17 so that it may be rotated in a clockwise direction, as viewed in Figure 2, to afford access to the parts of the machine located therebeneath, whenever required.

As will be understood from a study of the above-mentioned patent to H. A. Wood et al., a stereotype printing plate is moved over the core member 12 and positioned on the rollers 14 whereby the plate may proceed by gravity into the shaving arch 15 for processing. Figure 2 shows a stereotype plate 18 thus positioned in the shaving arch 15.

In order to prevent the plates from entering the machine before the elements of the machine are in proper positions to receive them, stop means are provided on the margin of the core member 12 to obstruct the movement of a stereotype plate toward the machine until the machine is prepared to receive same. Thus, a bracket member 19 is secured to the underside of the semi-cylindrical core member 12 adjacent its forward margin, said bracket member including a generally U-shaped forward portion 20 having the apertured vertical lugs 21, 21, parallel to each other and spaced apart, as shown in Figure 6. Designated at 22 is a weighted stop lever which is formed adjacent one end thereof with a pivot aperture 23, the stop lever being received between the parallel arms 21 and being pivotally connected thereto by a transverse pivot axis or pin 24 passing through the apertures of the lugs 21, 21 and through the aperture 23 in the stop lever 22.

The top marginal portion of the core member 12 is formed with a longitudinal slot 25 through which the forward upper portion of the stop lever 22 extends, the stop lever being formed with a notch 26 at its forward end engageable on the edge of the vertical portion of the slot 25 in the upper end portion of end wall 27 of core member 12, namely, on the edge 28 of the slot, as shown in Figure 2.

The lever 22 is weighted so that it is biased by gravity to a normal position wherein its top margin is below the top plane of the core member 12, whereby it does not obstruct the movement of a stereotype plate onto the rollers 14 in overlying relationship to the core member 12.

The lever 22 is formed subjacent to the pivot opening 23 thereof with a depending portion 29 in which is threadedly engaged a headed pivot bolt 30, said pivot bolt having a reduced stud portion 31 threadedly engaged in the depending member 29. Journaled on the shank of the pivot bolt 30 is a roller 32 which is thus supported beneath the apertured lugs 21, 21 as shown in Figures 3 and 5.

Designated at 33 is a rotary cam member which is mounted on the end of the driven shaft of the worm wheel 16 in a plane parallel to the normal axis of the pivot bolt 30. Secured on the rotary member 33 is the cam element 34 which is arranged to cammingly engage with the roller 32 at times and to cause the lever 22 to be rotated in a counterclockwise direction, as viewed in Figure 2, namely, to a position wherein its free end portion is elevated above the outside surface of the core member 12, for example, as shown in Figures 4 and 5. In this position, the free end portion of the stop lever 22 obstructs the movement of a stereotype plate into the machine and thereby prevents the feeding of the plate from the feed table 13 onto the rollers 14. The cam element 34 is arranged so that when the parts of the machine are not in the proper position to receive a stereotype plate, the cam element 34 will engage the roller 32 and maintain the stop lever 22 in a position rotated counterclockwise from its normal position, as viewed in Figure 2, whereby a stereotype plate cannot be fed into the machine. When the machine is prepared to receive a stereotype plate, the cam 34 is disengaged from the follower roller 32, and the stop lever 22 rotates by gravity to its normal, non-obstructing position, allowing a stereotype plate to be fed into the machine.

When the free end portion of the stop lever 22 is in an elevated position, as shown in Figures 4 and 5, the next plate is prevented from being moved into the machine and thus said next plate cannot interfere with the operation of the machine on a previously furnished plate. Thus fouling of the machine is prevented, breakage or other damage thereto is avoided and spoilage of the plates is eliminated.

While a specific embodiment of an improved plate feed regulator for a stereotype processing machine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a stereotype plate processing machine, a semi-cylindrical core member for positioning of a stereotype plate thereon and having a forward margin, said core member being provided with a longitudinal slot extending inwardly from the forward margin, a driven shaft within said core member and having one end adjacent the forward end of said core member, a cam element on one shaft end, a stop lever positioned within said core member adjacent said longitudinal slot and connected intermediate its ends to said core member for pivotal movement about a transverse axis, the portion of said lever adjacent one end being normally below the longitudinal slot and the portion of said lever adjacent the other end being normally adjacent to and spaced from said cam element, and weight means on the other end of said lever for biasing the portion of said lever adjacent one end to the normal position, said weight means being engageable at times with said cam element to elevate the portion of said lever adjacent one end to an obstructing position above the longitudinal slot.

2. In a stereotype plate processing machine, a semi-cylindrical core member for positioning of a stereotype plate thereon and having a forward margin, said core member being provided with a longitudinal slot extending inwardly from the forward margin, a driven shaft within said core member and having one end adjacent the forward end of said core member, a cam element on one shaft end, a stop lever positioned within said core member adjacent said longitudinal slot and connected intermediate its ends to said core member for pivotal movement about a transverse axis, the portion of said lever adjacent one end being normally below the longitudinal slot and the portion of said lever adjacent the other end being normally adjacent to and spaced from said cam element, weight means on the other end of said lever for biasing the portion of said lever adjacent one end to the normal position, and a follower roller on said weight means, said follower roller being engageable at times with said cam element to elevate the portion of said lever adjacent one end to an obstructing position above the longitudinal slot.

References Cited in the file of this patent

UNITED STATES PATENTS

| | | |
|---|---|---|
| 2,243,261 | Roesen | May 27, 1941 |
| 2,504,733 | Safranski | Apr. 18, 1950 |